(12) United States Patent
Xu et al.

(10) Patent No.: US 11,022,276 B2
(45) Date of Patent: Jun. 1, 2021

(54) WAVELENGTH CONVERSION DEVICE, MANUFACTURING METHOD THEREOF, AND RELATED ILLUMINATION DEVICE

(71) Applicant: APPOTRONICS CHINA CORPORATION, Shenzhen (CN)

(72) Inventors: Yanzheng Xu, Shenzhen (CN); Zifeng Tian, Shenzhen (CN); Qian Li, Shenzhen (CN); Hu Xu, Shenzhen (CN)

(73) Assignee: Appotronics Corporation Limited, Shenzhen (CN)

( * ) Notice: Subject to any disclaimer, the term of this patent is extended or adjusted under 35 U.S.C. 154(b) by 357 days.

(21) Appl. No.: 14/895,926

(22) PCT Filed: Jun. 7, 2014

(86) PCT No.: PCT/CN2014/079428
§ 371 (c)(1),
(2) Date: Dec. 3, 2015

(87) PCT Pub. No.: WO2014/194864
PCT Pub. Date: Dec. 11, 2014

(65) Prior Publication Data
US 2016/0123557 A1   May 5, 2016

(30) Foreign Application Priority Data

Jun. 8, 2013   (CN) .......................... 201310228456.9

(51) Int. Cl.
*C03C 8/14*      (2006.01)
*F21V 9/30*      (2018.01)
(Continued)

(52) U.S. Cl.
CPC .................. *F21V 9/30* (2018.02); *C03C 8/14* (2013.01); *C09K 11/02* (2013.01); *C09K 11/08* (2013.01);
(Continued)

(58) Field of Classification Search
CPC .......... F21V 9/16; F21V 29/505; F21V 29/70; F21V 13/08; C03C 8/14; C09K 11/02;
(Continued)

(56) References Cited

U.S. PATENT DOCUMENTS 3,459,574 A * 8/1969 Kolb ...................... B82Y 30/00
106/443
5,999,281 A * 12/1999 Abbott ................... G03B 21/62
156/166
(Continued)

FOREIGN PATENT DOCUMENTS

CN   201129667 Y   10/2008
CN   101614339 A   12/2009
(Continued)

OTHER PUBLICATIONS

International Search Report in the parent PCT application No. PCT/CN2014/079428, dated Aug. 29, 2014.
(Continued)

*Primary Examiner* — Rajarshi Chakraborty
*Assistant Examiner* — Fatima N Farokhrooz
(74) *Attorney, Agent, or Firm* — Chen Yoshimura LLP

(57) ABSTRACT

A wavelength conversion device, a manufacturing method thereof, and a related illumination device. The wavelength conversion device comprises a fluorescent powder layer (110) that is successively stacked, a diffuse reflection layer (120), and a high-thermal-conductivity substrate (130). The diffuse reflection layer (120) comprises white scattered particles for scattering the incident light; the high-thermal-
(Continued)

conductivity substrate (130) is one of an aluminum nitride substrate, a silicon nitride substrate, a silicon carbide substrate, a boron nitride substrate, and a beryllium oxide substrate. The wavelength conversion device has good reflectivity and thermal stability.

4 Claims, 4 Drawing Sheets

(51) Int. Cl.
    *G02B 5/08*     (2006.01)
    *G02B 5/02*     (2006.01)
    *C09K 11/02*     (2006.01)
    *G02B 7/18*     (2021.01)
    *C09K 11/08*     (2006.01)
    *F21V 29/505*     (2015.01)
    *F21V 29/70*     (2015.01)
    *F21V 13/08*     (2006.01)

(52) U.S. Cl.
    CPC ............ *F21V 13/08* (2013.01); *F21V 29/505* (2015.01); *F21V 29/70* (2015.01); *G02B 5/0242* (2013.01); *G02B 5/0284* (2013.01); *G02B 5/0808* (2013.01); *G02B 7/181* (2013.01)

(58) Field of Classification Search
    CPC .. G02B 5/0242; G02B 5/0284; G02B 5/0808; G02B 7/181; F21K 9/61; F21K 9/62; F21K 9/64
    See application file for complete search history.

(56) References Cited

U.S. PATENT DOCUMENTS

| | | | | |
|---|---|---|---|---|
| 8,723,409 | B2* | 5/2014 | Ichikawa | F21K 9/00 313/501 |
| 2004/0119400 | A1* | 6/2004 | Takahashi | C09K 11/02 313/504 |
| 2004/0257797 | A1* | 12/2004 | Suehiro | H01L 33/507 362/34 |
| 2005/0270775 | A1* | 12/2005 | Harbers | G02B 27/1046 362/231 |
| 2006/0131596 | A1* | 6/2006 | Ouderkirk | H01L 33/60 257/98 |
| 2007/0064131 | A1* | 3/2007 | Sawanobori | H01L 33/505 348/294 |
| 2007/0280608 | A1 | 12/2007 | Kadomi et al. | |
| 2009/0072700 | A1* | 3/2009 | Kameshima | C03C 14/004 313/483 |
| 2009/0315057 | A1 | 12/2009 | Konishi et al. | |
| 2010/0103681 | A1* | 4/2010 | Kamei | G02B 6/0006 362/298 |
| 2011/0149549 | A1 | 6/2011 | Miyake | |
| 2011/0309384 | A1* | 12/2011 | Ito | H01L 33/505 257/88 |
| 2012/0087103 | A1 | 4/2012 | Dai et al. | |
| 2013/0027931 | A1* | 1/2013 | Isogai | F21V 23/006 362/235 |
| 2013/0056775 | A1* | 3/2013 | Kawakami | F21V 9/16 257/98 |
| 2013/0140980 | A1* | 6/2013 | Deme | H01J 61/35 313/489 |
| 2013/0207145 | A1* | 8/2013 | Schneider | H01L 33/60 257/98 |
| 2014/0159092 | A1 | 6/2014 | Konishi et al. | |
| 2014/0239196 | A1* | 8/2014 | Shoji | G21K 4/00 250/488.1 |
| 2014/0361331 | A1 | 12/2014 | Konishi et al. | |
| 2015/0291469 | A1* | 10/2015 | Miyasaka | C03C 3/097 501/32 |
| 2016/0004147 | A1 | 1/2016 | Hu et al. | |
| 2016/0013387 | A1 | 1/2016 | Konishi et al. | |
| 2016/0359095 | A1 | 12/2016 | Konishi et al. | |

FOREIGN PATENT DOCUMENTS

| | | | | |
|---|---|---|---|---|
| CN | 102194807 | A | 9/2011 | |
| CN | 102267268 | A | 12/2011 | |
| CN | 102633440 | | 8/2012 | |
| CN | 102800791 | A | 11/2012 | |
| CN | 103968332 | A | 8/2014 | |
| GB | 1533395 | | * 11/1978 | |
| JP | 2007-323861 | A | 12/2007 | |
| JP | 2011-071404 | A | 4/2011 | |
| JP | 2011071404 | | * 4/2011 | ............... F21V 3/00 |
| JP | 2011-129354 | A | 6/2011 | |
| JP | 2011-165572 | A | 8/2011 | |
| JP | 2011-215568 | A | 10/2011 | |
| JP | 2012140479 | | 7/2012 | |
| JP | 2012-185980 | A | 9/2012 | |
| JP | 2012-243624 | A | 12/2012 | |
| WO | WO-2015055089 | A1 | * 4/2015 | ......... C09K 11/7774 |

OTHER PUBLICATIONS

IPRP in the parent PCT application No. PCT/CN2014/079428, dated Dec. 8, 2015.
Chinese Office Action, dated Apr. 21, 2015, and Search Report dated Apr. 8, 2015, in a counterpart Chinese patent application, No. CN 201310228456.9.
Chinese Office Action, dated Nov. 9, 2015, and Supplemental Search Report dated Oct. 29, 2015, in a counterpart Chinese patent application, No. CN 201310228456.9.
Chinese Office Action, dated May 26, 2017, and Search Report dated May 18, 2017, in a counterpart Chinese patent application, No. CN 201610605449.X.
Chinese Office Action, dated Feb. 13, 2018 in a counterpart Chinese patent application, No. CN 201610605449.X.
Chinese Office Action, dated Jul. 31, 2018 in a counterpart Chinese patent application, No. CN 201610605449.X.
Extended European Search Report and Written Opinion, dated May 19, 2016, in a counterpart EP application, No. EP 14808214.2.
Japanese Office Action, dated Nov. 15, 2016 in a counterpart Japanese patent application, No. JP 2016-517154.
Japanese Office Action, dated Jul. 31, 2018 in a counterpart Japanese patent application, No. JP 2017-135191.
Japanese Office Action, dated Mar. 26, 2019 in a counterpart Japanese patent application, No. JP 2017-135191.
Korean Office Action, dated Sep. 19, 2016 in a counterpart application KR 10-2015-7036667.
Taiwanese Office Action, dated Apr. 23, 2015, in a counterpart Taiwanese patent application, No. TW 103118100.

* cited by examiner

WAVELENGTH CONVERSION DEVICE, MANUFACTURING METHOD THEREOF, AND RELATED ILLUMINATION DEVICE

BACKGROUND OF THE INVENTION

Field of the Invention

This invention relates to illumination and display technologies, and in particular, it relates to a wavelength conversion device, a manufacturing method thereof, and a related light emitting device.

Description of Related Art

Using laser or LED as a light source to excite a phosphor material to obtain monochromatic light or polychromatic light is a widely used technology in illumination, projection and other application fields. Such technologies typically direct a light emitted by the laser or LED onto a phosphor color wheel which rotate at a high speed, to achieve good heat dissipation.

Color wheels in existing technologies include a two layer structure, where the lower layer is an aluminum substrate with a mirror surface, and the upper layer is a phosphor layer over the aluminum substrate.

The mirror-surface aluminum substrate primarily functions to reflect light and conduct heat. The mirror-surface aluminum substrate is typically constructed of a three-layer structure: an aluminum base, a high reflectivity layer, and a surface dielectric protection layer. The high reflectivity layer typically uses a high purity aluminum or high purity silver, and a dielectric layer is coated on the high reflectivity layer. The dielectric layer is formed of low refractive index material $MgF_2$ or $SiO_2$ and high refractive index material $TiO_2$, and functions to protect the high purity aluminum or high purity silver and to enhance reflectivity. This type of mirror-surface aluminum plate has two problems. First, the thermal expansion coefficients of the surface dielectric protection layer and the high reflectivity layer do not match, so the dielectric protection layer tends to be damaged during the stamping process, or even fall off. Second, for the high reflectivity silver layer which has a higher reflectivity, under high temperature, a gap may form between the dielectric protection layer and the high reflectivity layer, so that the high reflectivity layer comes into contact with the air; the silver atoms tend to react with the hydrogen sulfide or oxygen in the air in a sulfidation or oxidation reaction, which results in drastic reduction in the reflectivity and thermal stability of the high reflectivity layer. For an aluminum reflective layer, the thermal stability of aluminum is better than silver, but its reflectivity is not high enough. Therefore, under current fabrication conditions, mirror-surface aluminum substrate cannot withstand high temperature, and is not suitable for high power light emitting devices.

SUMMARY

Embodiments of the present invention provide a high temperature resistant wavelength conversion device, its manufacturing method, and related light emitting device.

An embodiment of the present invention provides a wavelength conversion device, which includes:

A phosphor layer, which includes a phosphor powder;
A diffuse reflection layer, which includes white scattering particles for scattering an incident light;

A high thermal conductivity substrate, which is selected from: an aluminum nitride substrate, a silicon nitride substrate, a silicon carbide substrate, a boron nitride substrate, and a beryllium oxide substrate;

Wherein the phosphor layer, the diffuse reflection layer and the high thermal conductivity substrate are stacked sequentially and affixed to each other.

Preferably, the thermal conductivity of the high thermal conductivity substrate is greater than or equal to 100 W/mK.

Preferably, the diffuse reflection layer further includes a first glass powder for adhering the white scattering particles.

Preferably, the phosphor layer further includes a second glass powder for adhering the phosphor powder.

Preferably, the white scattering particles include at least one of: barium sulfate particles, aluminum oxide particles, magnesium oxide particles, titanium oxide particles, and zirconium oxide particles.

Preferably, the diffuse reflection layer includes a first glass powder for adhering the white scattering particles, wherein the first glass powder and the second glass powder are the same high melting point glass powder.

Another embodiment of the present invention provides a light source device which includes the above described wavelength conversion device, and further includes an excitation light source for generating an excitation light, wherein the phosphor powder absorbs the excitation light to generate a converted light, and wherein the diffuse reflection layer scatter-reflects the converted light or a mixed light of the converted light and unabsorbed excitation light.

Another embodiment of the present invention provides a manufacturing method for a wavelength conversion device, which includes:

A. Obtaining a high thermal conductivity substrate, which is selected from: an aluminum nitride substrate, a silicon nitride substrate, a silicon carbide substrate, a boron nitride substrate, and a beryllium oxide substrate;

B. Obtaining a diffuse reflection layer, which includes white scattering particles for scattering an incident light;

C. Obtaining a phosphor layer, which includes a phosphor powder; and

D. Sequentially stacking the phosphor layer, the diffuse reflection layer and the high thermal conductivity substrate and affixing them to each other.

Preferably, step B and step D include:

Sintering the diffuse reflection layer on a surface of the high thermal conductivity substrate, wherein the diffuse reflection layer includes white scattering particles and a first glass powder, wherein the sintering temperature is lower than the melting point of the high thermal conductivity substrate, and affixing the phosphor layer on the surface of the diffuse reflection layer on the surface of the substrate.

Preferably, step B, step C and step D include:

Sintering the diffuse reflection layer on a surface of the high thermal conductivity substrate, wherein the diffuse reflection layer includes the white scattering particles and a first glass powder, wherein the sintering temperature is lower than the melting point of the high thermal conductivity substrate, and sintering the phosphor layer on the surface of the diffuse reflection layer on the surface of the substrate, wherein the phosphor layer includes a second glass powder and the phosphor powder, and wherein the sintering temperature is T3≤Tf+400° C., where Tf is the softening point of the first glass powder.

Preferably, the step of sintering the diffuse reflection layer on the surface of the high thermal conductivity substrate includes:

B1. Obtaining the white scattering particles, the first glass powder, and an organic carrier;

B2. Mixing the white scattering particles, the first glass powder, and the organic carrier to obtain a slurry of the scattering particles;

B3. Coating the slurry of the scattering particles over the high thermal conductivity substrate; and B4. Sintering the high thermal conductivity substrate which has been coated with the slurry of the scattering particles to obtain the diffuse reflection layer.

Preferably, the step of sintering the phosphor layer on the surface of the diffuse reflection layer on the surface of the substrate includes:

C1. Obtaining the second glass powder, the phosphor powder, and an organic carrier;

C2. Mixing the second glass powder, the phosphor powder, and the organic carrier to obtain a slurry of the phosphor powder;

C3. Coating the slurry of the phosphor powder over the surface of diffuse reflection layer of the high thermal conductivity substrate; and C4. Sintering the high thermal conductivity substrate which has been coated with the slurry of the phosphor powder to obtain the phosphor layer, wherein the sintering temperature is $T3 \leq Tf+400°$ C., where Tf is the softening point of the first glass powder. Preferably, the process includes, between step B3 and step B4: heating the high thermal conductivity substrate which has been coated with the slurry of the scattering particles at a temperature T1 for over 0.2 hours, wherein $Tb-100°$ C.$\leq T1 \leq Tb+200°$ C., where Tb is the complete break down temperature of the organic carrier.

Compared with conventional technologies, the embodiments of the present invention have the following advantages:

In embodiments of the present invention, the wavelength conversion device uses a diffuse reflection layer and a high thermal conductivity substrate to replace the mirror-surface aluminum substrate of the conventional technology. The diffuse reflection layer includes white scattering particles, which can scatter incident light, so that the mirror reflection of the conventional metal reflective layer is replaced with a diffuse reflection process to achieve reflection of the incident light. Moreover, even at high temperature, the white scattering particles will not be oxidized and become absorbent of the incident light. Therefore, even at high temperature, the diffuse reflection layer will not have reduced reflectivity, making the device high temperature resistant. Meanwhile, because the high thermal conductivity substrate is one of aluminum nitride, silicon nitride, silicon carbide, boron nitride, and beryllium oxide, the melting points of these ceramic materials are much higher than that of metal aluminum, so they can withstand higher temperature than aluminum. As a result, the wavelength conversion device according to embodiments of the present invention can withstand high temperature.

DETAILED DESCRIPTION OF PREFERRED EMBODIMENTS

Embodiments of the present invention are described below with reference to the drawings.

Figure 1A:
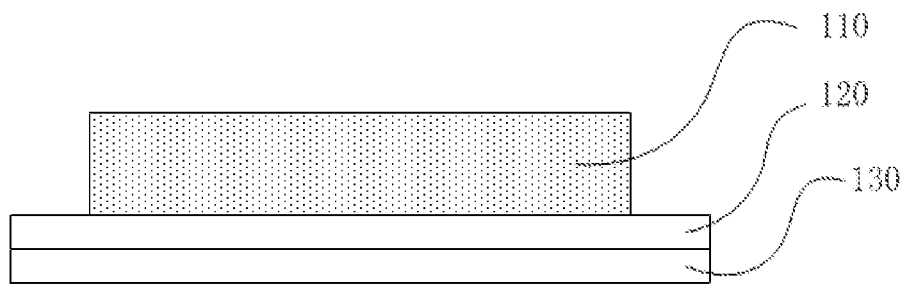
FIG. 1a schematically illustrates the structure of a wavelength conversion device according to an embodiment of the present invention.

Refer to FIG. 1a, which schematically illustrates the structure of a wavelength conversion device according to an embodiment of the present invention. As shown in FIG. 1a, the wavelength conversion device includes a phosphor layer 110, a diffuse reflection layer 120, and a high thermal conductivity substrate 130, which are sequentially stacked and affixed together.

The phosphor layer 110 includes a phosphor powder. The phosphor powder absorbs an excitation light and is excited by it to generate a converted light having a wavelength different from that of the excitation light. For example, YAG (yttrium aluminium garnet) phosphor can absorb blue and UV excitation light to generate a yellow converted light. The phosphor powder may also be a red phosphor, a green phosphor, etc.

The diffuse reflection layer 120 reflects the incident light. It includes white scattering particles. The white scattering particles are typically a salt or oxide powder, such as barium sulfate powder, aluminum oxide powder, magnesium oxide powder, titanium oxide powder, zirconium oxide powder, etc., which absorbs virtually no light. Moreover, the white scattering materials have stable properties and do not oxidize at high temperature. Considering that the diffuse reflection layer should have a good heat dissipation effect, preferably, an aluminum oxide powder which has relatively high thermal conductivity is used. Of course, to accomplish the reflection of the incident light by the diffuse reflection layer 120, the white scattering material in the diffuse reflection layer 120 should have sufficient compactness and thickness, which can be determined through experimentation.

Although metals have high thermal conductivity, when the temperature of a metal exceeds a half of its melting point, the metal plate may deform due to the temperature. For example, aluminum plate, steel plate, copper plate, etc., in particular when they are used as a substrate for forming a high melting point glass (glass with a softening point over 500° C.), tend to deform. Therefore, the high thermal conductivity substrate 130 may be formed of a ceramic material having a thermal conductivity greater than or equal to 100 W/mK, so that they can withstand relatively high temperature while realizing high thermal conductivity. This types of high thermal conductivity substrates are typically ceramic plates with compact structures, such as aluminum nitride, silicon nitride, boron nitride, beryllium oxide, etc. Further, although the thermal conductivity of silicon carbide is only 80 W/mK, experiments show that it can also be used as a high thermal conductivity substrate. The melting points of these high thermal conductivity substrates are all above 1500° C., much higher than the melting point of aluminum (700° C.), so they can withstand relatively high temperatures.

The wavelength conversion device uses the diffuse reflection layer and the high thermal conductivity substrate to replace the mirror-surface aluminum substrate of the conventional technology. The diffuse reflection layer includes white scattering particles for scattering the incident light, so that the mirror reflection of the conventional metal reflective layer is replaced with a diffuse reflection process to achieve reflection of the incident light. Moreover, even at high temperatures, the white scattering particles will not be oxidized and become absorbent of the incident light. Therefore, even at high temperature, the diffuse reflection layer will not have reduced reflectivity, making the device high temperature resistant. Also, because the high thermal conductivity substrate is one of aluminum nitride, silicon nitride, silicon carbide, boron nitride, and beryllium oxide, they can withstand higher temperatures than aluminum. As a result, the wavelength conversion device according to embodiments of the present invention can withstand high temperatures.

In one example, aluminum nitride ceramic is used as the substrate and an aluminum oxide powder of 0.2 mm is disposed on its surface to form the diffuse reflection layer, where the particle diameter distribution of the aluminum oxide powder is between 0.2 μm to 0.5 μm, and the mass ratio of the aluminum oxide powder with the adhesive is 6:1. The measured reflectivity of such a diffuse reflection layer is 99.5% of that of the mirror-surface aluminum substrate, i.e., almost identical to that of the mirror-surface aluminum substrate. Of course, the particle diameters of the diffuse reflection particles, the thickness of the diffuse reflection layer and its compactness can be other values, which can be obtained by those skilled in the art through routine experimentation.

Figure 1B:
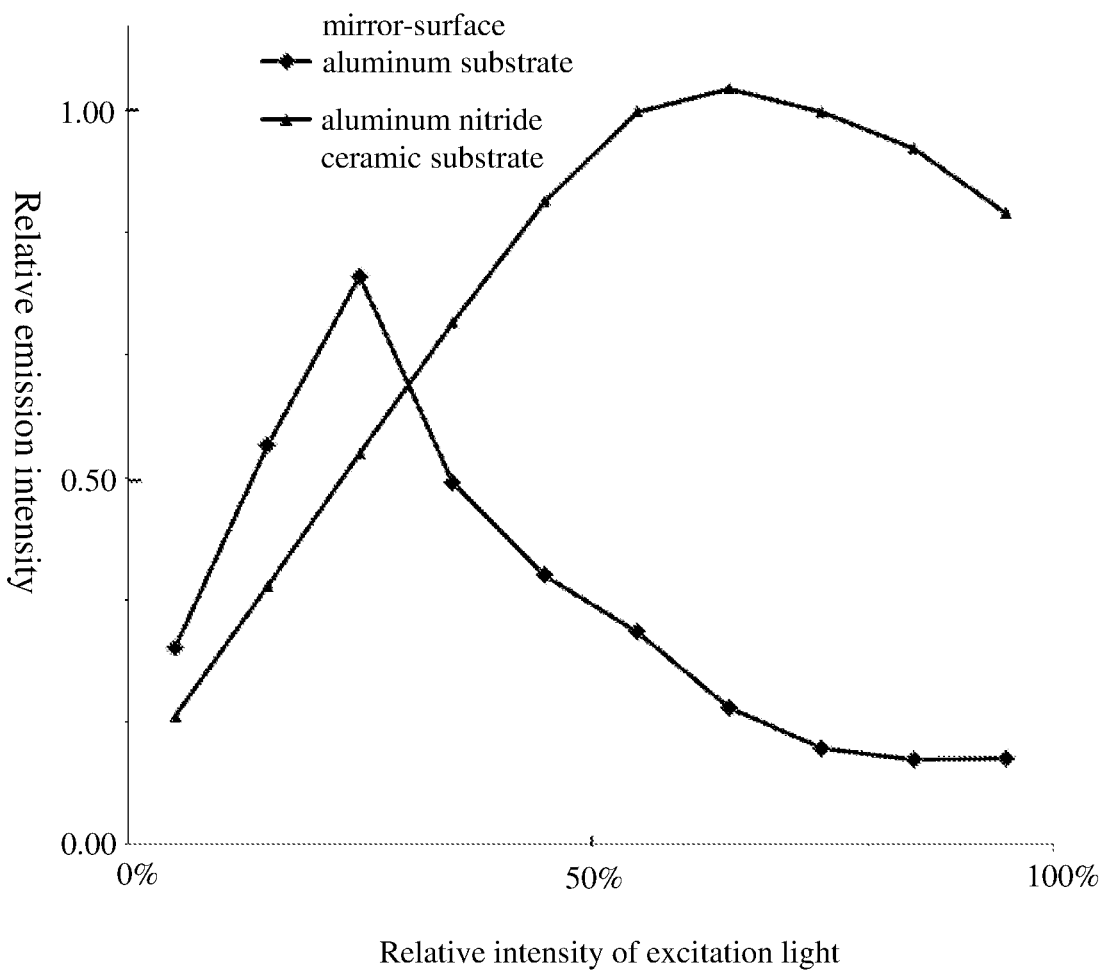
FIG. 1b illustrates relative light emission intensity curves of wavelength conversion devices using a mirror-surface aluminum substrate and using an aluminum nitride ceramic substrate, respectively, under different excitation light powers.

A phosphor layer is disposed on the surface of the above described diffuse reflection layer to obtain the wavelength conversion device. Under the illumination of an excitation light with a maximum power of 14 W, a wavelength conversion device using a mirror-surface aluminum substrate and a wavelength conversion device using the above described aluminum nitride ceramic substrate both receive the incident excitation light, and the phosphor layers of both wavelength conversion devices are sealed with a silica gel. FIG. 1b illustrates relative light emission intensity curves of the wavelength conversion devices using a mirror-surface aluminum substrate and using an aluminum nitride ceramic substrate, respectively, under different excitation light powers. As shown in FIG. 1b, the horizontal axis is the excitation light power, which has a maximum power of 14 W as stated above; the vertical axis is the relative light emission intensity of the converted light generated by the wavelength conversion device. As the excitation light power increases, the relative light emission intensity of the wavelength conversion device using mirror-surface aluminum substrate increases gradually. But when the excitation light power increases to above 30% of the maximum power, on the wavelength conversion devices using the mirror-surface aluminum substrate, the silica gel of the phosphor layer decomposes due to high temperature and becomes dark, causing the relative light emission intensity of the wavelength conversion device to decrease. Moreover, as the excitation light power increases further, the decomposition of the silica gel is more severe, and the relative light emission intensity drops even more. On the other hand, for the wavelength conversion device using the aluminum nitride ceramic substrate, in the initial stage, its relative light emission intensity increases gradually as the excitation light power increases. When the excitation light power increases to above 70% of the maximum power, this wavelength conversion devices experiences the darkening of the silica gel of the phosphor layer, causing the relative light emission intensity of the wavelength conversion device to decrease; but its rate of decrease of the relative light emission intensity is slower than that of the wavelength conversion device using the mirror-surface aluminum substrate.

For mirror-surface aluminum substrate, its surface is relatively smooth; after the phosphor layer is formed on the surface of the mirror-surface aluminum substrate, the contact surface of the phosphor layer with the substrate will contract, and partially separate form the substrate. Thus, the contact surface area of the phosphor layer with the mirror-surface aluminum substrate is relatively small, and the thermal resistance of the interface between the phosphor layer and the mirror-surface aluminum substrate is relatively large. On the other hand, for the wavelength conversion device using the aluminum nitride ceramic substrate, because the surface of both the ceramic substrate and the diffuse reflection layer are relatively rough, the contact surface areas between the phosphor layer and the diffuse reflection layer and between the diffuse reflection layer and the ceramic substrate are relatively large, so that the interfacial thermal resistance of the formed wavelength conversion device is relatively small. Therefore, the heat generated by the phosphor layer can be better conducted to the ceramic substrate, so that the wavelength conversion device can withstand higher temperature.

In this embodiment, the wavelength conversion device uses a diffuse reflection layer and a high thermal conductivity substrate to replace the mirror-surface metal substrate of the conventional technology. The diffuse reflection layer includes white scattering particles, which can scatter incident light, so that the mirror reflection of the conventional metal reflective layer is replaced with a diffuse reflection process to achieve reflection of the incident light. Moreover, even at high temperature, the white scattering particles will not be oxidized and become absorbent of the incident light. Therefore, the diffuse reflection layer can withstand high temperature. Also, because the high thermal conductivity substrate is at least one of aluminum nitride, silicon nitride, silicon carbide, boron nitride, and beryllium oxide, the melting points of these ceramic materials are much higher than those of metals, so they can withstand higher temperature than metal. Also, although the thermal conductivities of these ceramic substrates are slightly lower than that of an aluminum substrate, they are still higher than those of iron and some other metals. Moreover, the interfacial thermal resistance between the high thermal conductivity substrate and the diffuse reflection layer and between the diffuse reflection layer and the phosphor layer is relatively low, so the heat generated by the phosphor layer can be conducted to the ceramic substrate and dissipated into the air, which improves the thermal stability of the wavelength conversion device. Therefore, the wavelength conversion device of this embodiment can take into consideration both the reflectivity and thermal stability of the wavelength conversion device.

In practice, the phosphor powder is typically sealed by and adhesive into an integral mass. A typical adhesive is silica gel, which has stable chemical properties and a high mechanical strength. However, as mentioned earlier, silica gel can withstand relatively low temperatures, typically between 300° C. and 500° C. For use in high power light emitting devices, preferably, an inorganic adhesive is used to adhere the phosphor powder into an integral mass. The inorganic adhesive may be sodium silicate, glass powder, etc., to achieve a high temperature resistant reflective type phosphor wheel.

Preferably, the adhesive of the phosphor layer 110 is a second glass powder. Glass powder is an irregularly shaped, particulate, homogeneous glass substance, which is highly transparent and has stable chemical properties. The second glass powder and the phosphor powder can be formed by sintering, so that the binding force between the phosphor layer 110 and diffuse reflection layer 120 is very strong, and the formed phosphor layer 110 is highly transparent and also temperature resistant.

Figure 1C:
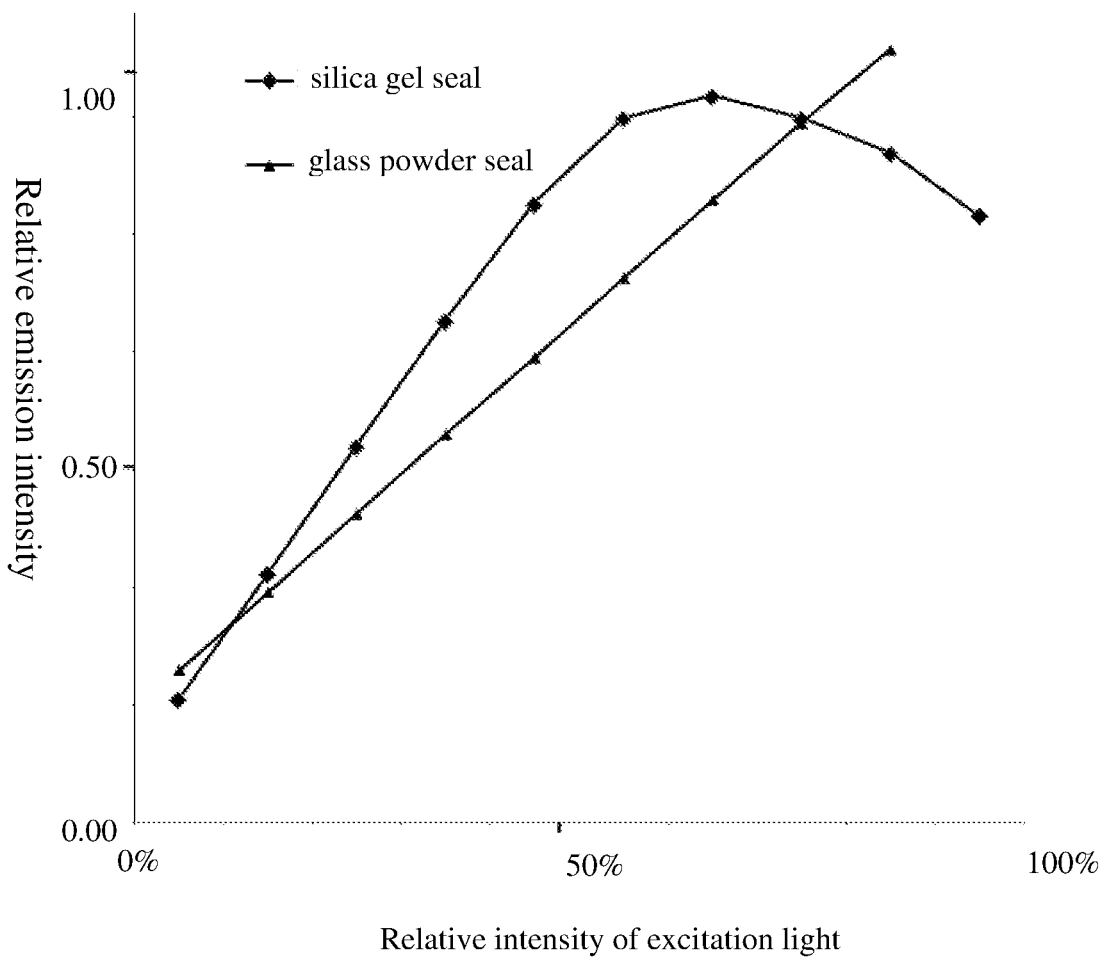
FIG. 1c illustrates relative light emission intensity curves of wavelength conversion devices using phosphor powder layer sealed with silica gel and using phosphor powder sealed with glass powder, respectively, under different excitation light powers.

For example, FIG. 1c illustrates relative light emission intensity curves of wavelength conversion devices using phosphor powder layer sealed with silica gel and using phosphor powder layer sealed with glass powder, respectively, under different excitation light powers. The substrates in both cases are aluminum nitride ceramic substrates. As shown in FIG. 1, the horizontal axis is the excitation light power, which has a maximum power of 14 W, and the vertical axis is the relative light emission intensity of the converted light. For the wavelength conversion device using a silica gel seal, when the excitation light power increases to above 70% of the maximum power, the silica gel of the phosphor layer becomes dark, causing the relative light emission intensity of the wavelength conversion device to decrease. Whereas for the wavelength conversion device using a glass powder seal, because the softening point of the glass powder is relatively high and it does not become dark, when the excitation light power increases, the relative light emission intensity of the wavelength conversion device increases approximately linearly.

Similarly, the white scattering particles also need to be adhered into an integral mass using an adhesive. The adhesive may likewise be silica gel, sodium silicate, etc. Preferably, the white scattering particles are adhered by a first glass powder. Here, the first glass powder may be the same glass powder as the second glass powder, or different ones. In the diffuse reflection layer, the first glass powder adheres the white scattering particles together, and insulates them form the air, to prevent them from becoming damp due to humidity in the air, and to give the diffuse reflection layer relatively high strength and light transmission rate. Further, when the adhesives for both the phosphor layer 110 and the diffuse reflection layer 120 are glass powders, the phosphor layer 110 can be sintered on the surface of the diffuse reflection layer 120, or the diffuse reflection layer 120 can be sintered on the surface of the phosphor layer 110, so that the binding force between the two is strong.

It should be noted that in a process where the diffuse reflection layer 120 is formed first and then the phosphor layer 110 is sintered on the surface of the diffuse reflection layer 120, when sintering the phosphor layer 110, damage to the diffuse reflection layer 120 should be avoided. It is easy to understand that, when the sintering temperature T3 is lower than the softening point of the first glass powder, the first glass powder will not soften during the forming of the phosphor layer 110, so the diffuse reflection layer 120 will not be impacted. But it was discovered through experiments that, even when the sintering temperature T3 is higher than the softening point of the first glass powder, so long as the fluidity of the first glass powder is not too high, damage to the diffuse reflection layer can be avoided. To ensure that during the sintering of the phosphor layer 110 the fluidity of the softened first glass is not too high, it has been shown by experiments that the sintering temperature T3 should satisfy the following condition: T3≤Tf+400° C., where Tf is the softening point of the first glass powder.

Similarly, if the phosphor layer 110 is formed first and then the diffuse reflection layer 120 is sintered on the surface of the phosphor layer 110, the sintering temperature T3 should satisfy the following condition: T3≤Tf+400° C., where Tf is the softening point of the second glass powder.

Actually, the first glass powder and the second glass powder may be the same glass powder; as long as the sintering temperature of the second sintering step is controlled in the above described manner, damage to the first sintered diffuse reflection layer 120 or phosphor layer 110 can be avoided. Thus, the two sintering steps can even use the same temperature. For example, the first glass powder and the second glass powder may both be high melting point glass powder, such as silicate glass powder. Compared to low melting point glass powder, high melting point glass powder has better transparency, which can reduce light loss.

In the diffuse reflection layer 120 and phosphor layer 110, the first glass powder and the second glass powder need to transmit incident light well, and also need to conduct heat well. Thus, preferably, the first glass powder and/or the second glass powder are borosilicate glass powder. Borosilicate glass powder has stable properties and high transparency; compared to other glass powder, it also has high thermal conductivity. Moreover, because the softening point of the first glass powder and the second glass powder should be different, and borosilicate glass powder has a relatively high softening point, this glass powder can be used as the one of the first and second glass powders that is required to have a higher softening point.

The main function of the white scattering particles of the diffuse reflection layer 120 is to scatter the incident light. To achieve better scattering effect, the particle diameters of the white scattering particles should cover the range of 0.2-0.5 μm. This is because typical particles have the highest reflectivity for light having a wavelength that is about twice the diameter of the particles. The above particle diameter range corresponds to the wavelength range of 400 to 800 nm of visible light. Of course, the smaller the particle diameters of the white scattering particles, and the higher the packing density of the white scattering particles in the diffuse reflection layer, the better the scattering effect. But experiments show that at the same density, particles having diameters in the 0.2-0.5 μm range have the best scattering effect. On the other hand, it is understood that for the same white scattering particles, the higher the mixing proportion of the white scattering particles, and the thicker the diffuse reflection layer 120, the higher the reflectivity.

The diffuse reflection layer 120 can be affixed to the high thermal conductivity substrate 130 by adhesion. However, using an adhesion method, due to the existence of the adhesive, an interface layer is present between the diffuse reflection layer 120 and the high thermal conductivity substrate 130, which can interfere with the heat conduction from the diffuse reflection layer 120 to the high thermal conductivity substrate 130. Thus, preferably, the diffuse reflection layer 120 is directly sintered on the high thermal conductivity substrate 130. This way, the high thermal conductivity substrate 130 and the diffuse reflection layer 120 have a strong binding force and high heat conductivity. When the adhesive of the diffuse reflection layer 120 is the first glass powder, certain chemical binding occurs between the glass powder and the matrix of the ceramic high thermal conductivity substrate 130. The binding force between the two is much stronger than the binging force between glass and metal. Further, the thermal expansion coefficients of glass and ceramic match better. Moreover, because the high thermal conductivity substrate 130 has relatively high thermal conductivity coefficient, it can conduct heat well, like metal.

Further, to take advantage of the strong binging force between the ceramic substrate and the diffuse reflection layer 120, and to take advantage of the high thermal conductivity of metal substrates, the high thermal conductivity substrate 130 may be a composite structure of ceramic substrate coated with copper. The composite structure can be realized by forming a diffuse reflection layer on one surface of the ceramic substrate, then coating the other surface of the ceramic substrate with copper. This can avoid oxidation and deformation of the copper.

Figure 2:
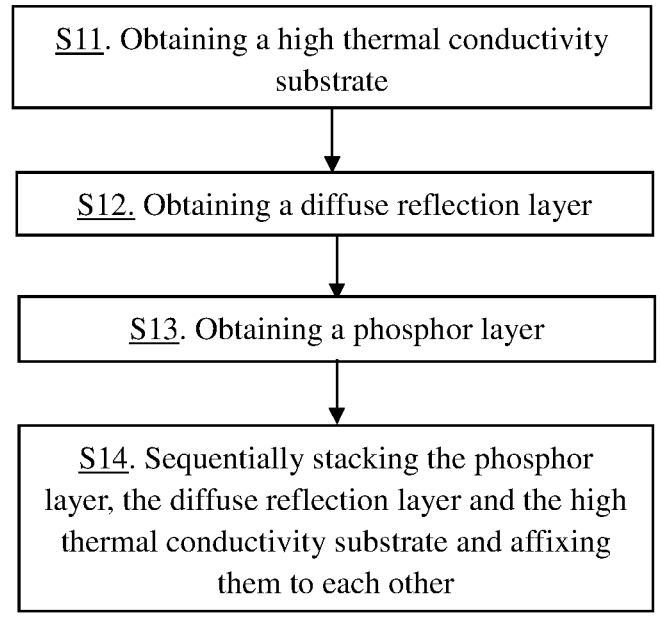
FIG. 2 is a flow chart of a manufacturing process for a wavelength conversion device according to another embodiment of the present invention.

To obtain the above wavelength conversion device, an embodiment of the present invention provides a manufacturing method for the wavelength conversion device. Refer to FIG. 2, which is a flow chart of a manufacturing process for a wavelength conversion device according to an embodiment of the present invention. As shown in FIG. 2, the method includes the following steps:

S11. Obtaining a high thermal conductivity substrate.

The high thermal conductivity substrate is one of an aluminum nitride substrate, a silicon nitride substrate, a silicon carbide substrate, a boron nitride substrate, and a beryllium oxide substrate.

S12. Obtaining a diffuse reflection layer.

The diffuse reflection layer includes white scattering particles for scattering an incident light. The diffuse reflection layer may be formed by mixing an adhesive such as silica gel with the white scattering particles and then forming a coating, or formed by sintering an adhesive such as glass powder with the white scattering particles, or formed by mixing sodium silicate with the white scattering particles and then forming the layer by deposition.

S13. Obtaining a phosphor layer.

The phosphor layer includes a phosphor powder. The phosphor powder may be adhered together by an adhesive. The adhesive may be silica gel, sodium silicate, glass powder, etc. The forming method depends on the adhesive used. For example, the phosphor powder may be mixed with a silica gel and then formed by coating, or mixed with sodium silicate and then formed by deposition.

It should be noted that the order of performing steps S11, S12 and S13 is not fixed. S14. Sequentially stacking the phosphor layer, the diffuse reflection layer and the high thermal conductivity substrate and affixing them to each other.

Step S14 may be performed after steps S11, S12 and S13. For example, after obtaining the phosphor layer, the diffuse reflection layer and the high thermal conductivity substrate, the three may be sequentially adhered together using adhesives. In such a method, the phosphor layer and the diffuse reflection layer may be formed using other substrates and then released from such substrates.

Step S14 may alternatively be performed concurrently with steps S11, S12 and S13. For example, after obtaining the diffuse reflection layer and the high thermal conductivity substrate, the two are adhered to each other, and then the phosphor layer is obtained and is adhered to the diffuse reflection layer. Or, after obtaining the diffuse reflection layer and the phosphor layer, the two are first adhered to each other, and then the high thermal conductivity substrate is obtained and adhered to the diffuse reflection layer.

Also, the obtaining of the diffuse reflection layer and the adhering of the diffuse reflection layer with the high thermal conductivity substrate may be performed concurrently. For example, the diffuse reflection layer may be directly formed on the surface of the high thermal conductivity substrate. Similarly, the obtaining of the diffuse reflection layer and the adhering of the diffuse reflection layer to the phosphor layer may be performed concurrently. For example, the diffuse reflection layer may be directly formed on the surface of the phosphor layer. The obtaining of the phosphor layer and the adhering of the diffuse reflection layer to the phosphor layer may be performed concurrently. For example, the phosphor layer may be directly formed on the surface of the diffuse reflection layer.

The above manufacturing method can be used to make a wavelength conversion device that includes stacked phosphor layer, diffuse reflection layer and high thermal conductivity substrate.

Figure 3:
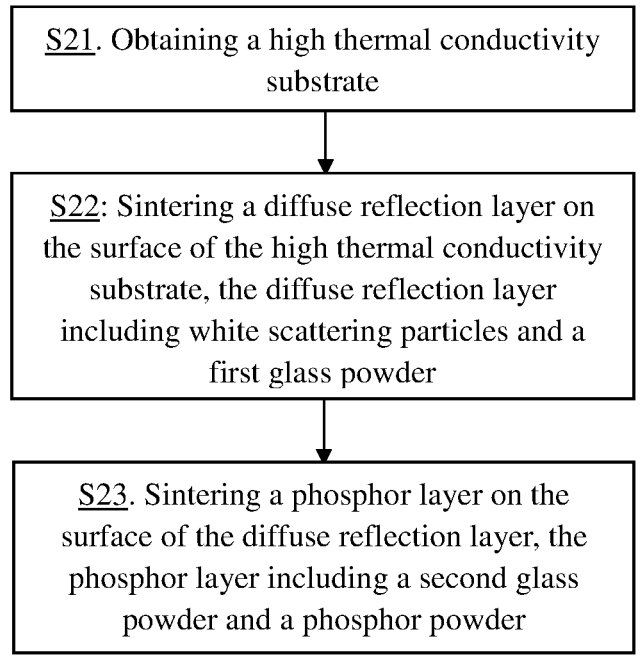
FIG. 3 is a flow chart of a manufacturing process for a wavelength conversion device according to another embodiment of the present invention.

In the above manufacturing method, each step may be implemented in many ways. To simplify the process, an embodiment of the present invention provides an optimized manufacturing method. Refer to FIG. 3, which is a flow chart of a manufacturing process for a wavelength conversion device according to another embodiment of the present invention. As shown in FIG. 3, the method includes the following steps:

S21. Obtaining a high thermal conductivity substrate.

Refer to the description of step S11 for an explanation of step S21.

S22: Sintering a diffuse reflection layer on the surface of the high thermal conductivity substrate. The diffuse reflection layer includes white scattering particles and a first glass powder.

In step S22, steps S12 and S14 in the method of FIG. 2 are carried out concurrently. This simplifies the process; further, direct sintering improves the binding between the diffuse reflection layer and the high thermal conductivity substrate, and eliminates the interfacial thermal resistance caused by an adhesive.

To avoid damaging the high thermal conductivity substrate during the sintering of the diffuse reflection layer, the sintering temperature should be lower than the melting point of the high thermal conductivity substrate.

S23. Sintering a phosphor layer on the surface of the diffuse reflection layer. The phosphor layer includes a second glass powder and a phosphor powder.

In step S23, steps S13 and S14 in the method of FIG. 2 are carried out concurrently. This simplifies the process and eliminates the interfacial thermal resistance caused by an adhesive. Further, the phosphor layer includes the second glass powder and a phosphor powder; compared to using silica gel mixed with phosphor powder and then forming by coating, the second glass powder is more temperature resistant than silica gel. Also, the binding force between glass and glass is much stronger than that between glass and silica gel, so the binding between the diffuse reflection layer and the phosphor layer is increased. Thus, sealing with glass powder is a preferred method. Of course, to prevent damaging the diffuse reflection layer during sintering of the phosphor layer, in this step, the sintering temperature T3 should satisfy the condition $T3 \leq Tf+400°$ C., where Tf is the softening temperature of the first glass powder.

Further, it should be noted that step S22 does not have to be combined with step S23. For example, after step S22, the phosphor powder and silica gel may be mixed and coated on the surface of the diffuse reflection layer, and heated to form the layer. Or, the phosphor layer may be preformed and then adhered to the surface of the diffuse reflection layer.

Further, the sintering sequence of the diffuse reflection layer and the phosphor layer does not have to be the same as described above; other sequence may be used. For example, the phosphor layer may be formed by sintering first, then the diffuse reflection layer is sintered on the surface of the phosphor layer or the high thermal conductivity substrate, and last, the phosphor layer, the diffuse reflection layer and the high thermal conductivity substrate are stacked together and sintered again. Alternatively, the phosphor layer may be formed by sintering first, and a powder mixture of the first glass powder and the white scattering particles is coated on the surface of the high thermal conductivity substrate, and then the phosphor layer is placed to cover the powder mixture, so that the phosphor layer, the powder mixture, and the high thermal conductivity substrate are sequentially stacked, and are then sintered. Thus, while forming the diffuse reflection layer, the three layers are sintered together. When the phosphor layer is sintered first and the diffuse reflection layer is sintered later, to prevent damaging the phosphor layer while sintering the diffuse reflection layer, the sintering temperature T3 of the diffuse reflection layer should satisfy the condition $T3 \leq Tf+400°$ C.

Figure 4:
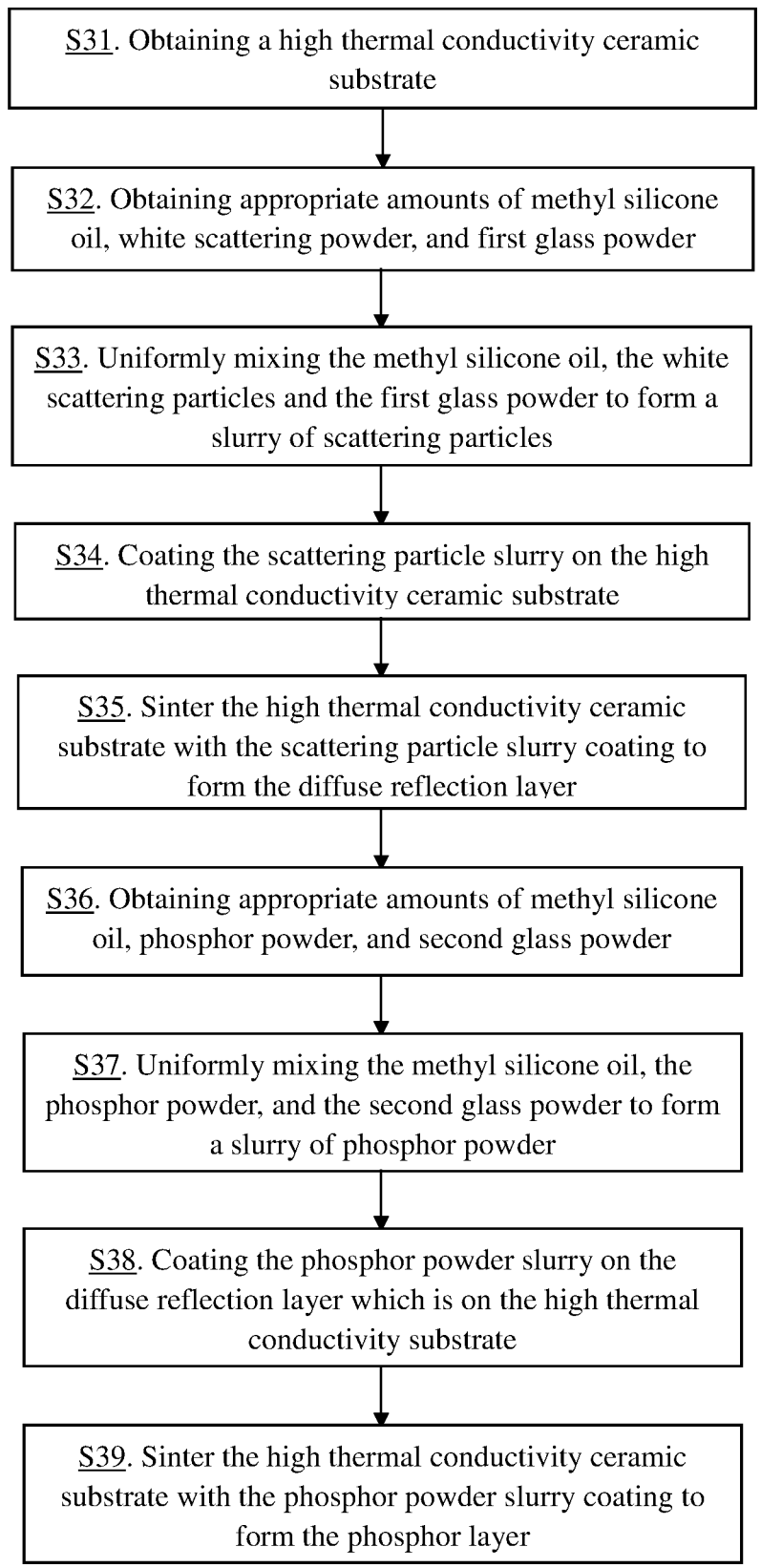
FIG. 4 is a flow chart of a manufacturing process for a wavelength conversion device according to another embodiment of the present invention.

At room temperature, both the glass powder and the phosphor powder are solid powders, and the compatibility of the two is not good. So in the mixture, voids are present between the glass powder particles and phosphor powder particles, and the particles do not mix well to form an integral mass. As a result, the phosphor layer obtained by sintering the mixture tends to have air cavities and other defects. Due to the presence of the air cavities, the excitation light may directly pass through the phosphor layer through the air cavities, without exciting the phosphor powder. To solve this problem, another embodiment is disclosed. Refer to FIG. 4, which is a flow chart of a manufacturing process for a wavelength conversion device according to another embodiment of the present invention. As shown in FIG. 4, the method includes the following steps:

S31. Obtaining a high thermal conductivity ceramic substrate.

Refer to the description of step S11 for an explanation of step S31.

S32. Obtaining appropriate amounts of methyl silicone oil, white scattering powder, and first glass powder.

Silicone oil is a mixture of polyorganosiloxanes of different degrees of polymerization. Methyl silicone oil, ethyl silicone oil, phenyl silicone oil, methyl phenyl silicone oil, etc. are commonly used silicone oils. Silicone oil has certain viscosity, and has relatively small surface tension, so it can easily wet the white scattering particles and the first glass powder and mix them into an integral mass. Among them, methyl silicone oil has relatively high complete break down temperature, high viscosity, and high thermal stability; its viscosity does not change with temperature, which is advantageous for subsequent adjustment of the viscosity of the slurry; and it will not easily experience phase separation. Thus, it is a preferred organic carrier. Of course, in addition to silicone oil, other organic carriers that have sufficient viscosity and that can adhere the white scattering particles and the first glass powder into a mass of certain fluidity can be used. Examples include glycol, PVB (polyvinyl butyral), ethyl cellulose, etc. These substances will decompose and evaporate after sintering or only leave small amounts of residues that have negligible impact on the scattering effect of the diffuse reflection layer.

The amount of the methyl silicone oil should be at least sufficient to wet the white scattering particles and the first glass powder, so that the three mix to form an integral mass. The amounts of the white scattering particles and the first glass powder can be determined based on practical need, so long as the first glass powder can adhere the white scattering particles into an integral body in the subsequent sintering.

S33. Uniformly mixing the methyl silicone oil, the white scattering particles and the first glass powder to form a slurry of scattering particles.

To solve the problem that it is difficult to form the white scattering particles and the first glass powder into an integral mass, in this step, the white scattering particles, the first glass powder and the methyl silicone oil are mixed into an integral mass, such that the methyl silicone oil acts as a carrier for the white scattering particles and the first glass powder, to obtain the scattering powder slurry.

To achieve uniform mixing, mechanical stirring may be used to perform the mixing. Here, step S33 may be performed after step S32, to mix the three substances uniformly. Alternatively, steps S33 and S32 may be performed concurrently, for example, by obtaining a certain amount of the first glass powder and white scattering particles, stirring the first glass powder and white scattering particles to mix them, meanwhile obtaining a certain amount of the methyl silicone oil, and gradually adding it to the first glass powder and white scattering particles while stirring.

S34. Coating the scattering particle slurry on the high thermal conductivity ceramic substrate.

The high thermal conductivity ceramic substrate is the carrier for the scattering particle slurry. The scattering particle slurry may be coated on the high thermal conductivity ceramic substrate using a blade or other methods. Preferably, the scattering particle slurry may be coated using a screen printing method, which can make the thickness of the coating of the scattering particle slurry on the high thermal conductivity ceramic substrate more uniform. As a result, thermal stress of the sintered layer is reduced.

S35. Sinter the high thermal conductivity ceramic substrate with the scattering particle slurry coating to form the diffuse reflection layer.

To sinter the scattering particle slurry, the sintering temperature should be above the softening point of the first glass powder in the scattering particle slurry; this way, the glass powder become a liquid phase, which helps to sinter it and the scattering particles into a compact diffuse reflection layer. But the temperature should not be too high, because otherwise certain amount of the white scattering powder can chemically react with the glass powder which can impact the diffuse reflection efficiency. It was discovered through experiments that a sintering temperature T2 in the range $Tf<T2 \leq Tf+400°$ C. promotes formation, where Tf is the softening temperature of the first glass powder.

It was discovered through experiments that, if the substrate coated with the scattering particle slurry is directly sintered, the diffuse reflection layer formed by sintered scattering particle slurry may contain many air cavities. This is because the flash point of the silicone oil is typically much lower than the softening point of the glass powder; when directly heating at a temperature near the softening point of the glass powder, the silicone oil evaporates at too high a speed, forming air cavities in the diffuse reflection layer. Therefore, in this embodiment, the scattering particle slurry is heated at a low temperature before sintering, so allow at least a part of the silicone oil to slowly evaporate.

Preferably, the following step is performed before step S35: Heating the substrate coated with the scattering particle slurry at 200° C. for 0.2 hours. When heated at 200° C. (which is 100° C. below the flash point of the methyl silicone oil which is 300° C.) for 0.2 hours, a large portion of the silicone oil will evaporate or decompose, and the residual silicone oil can evaporate or decompose during sintering of the scattering particle slurry. Of course, it should be understood that the lower the heating temperature, the longer the heating time required to remove all the methyl silicone oil. Also, the longer the heating time, the smaller the amount of residual methyl silicone oil. To reduce heating time, the heating temperature for the scattering particle slurry and substrate may be increased; but to ensure that the methyl silicone oil evaporates at a relatively slow speed, the heating temperature should be below 500° C. (which is 200° C. above the flash point of the methyl silicone oil which is 300° C.). For example, when the heating temperature is 500° C., after heating for 0.2 hours, more methyl silicone oil in the scattering particle slurry can evaporate, and the time required to completely evaporate the methyl silicone oil is shorter than that at a 200° C. heating temperature.

When other types of silicone oil is used to replace methyl silicone oil, to control the evaporation speed and evaporation amount of the silicone oil, the heating temperature for the substrate coated with the scattering particle slurry should be controlled to be T1, such that Tb−100° C.≤T1≤Tb+200° C., where Tb is the flash point of the silicone oil. The silicone oil will decompose and evaporate near its flash point. Of course, it is also possible to replace silicone oil with other organic additives, so long as the heating temperature for the substrate coated with the scattering particle slurry is controlled to be T1, such that Tb−100° C.≤T1≤Tb+200° C., where Tb is the complete break down temperature of the organic additive.

In fact, if glycol replaces silicone oil to be mixed with the first glass powder and the white scattering particles, even after a low temperature heating to remove the organic carried, the diffuse reflection layer so formed will have many air cavities. This is because glycol is a pure substance; when heated to near its flash point, all glycol quickly evaporates, leaving the solid state white scattering particles and the first glass powder, and the volumes initially occupied by the glycol that has since evaporated become air cavities. On the other hand, silicone oil is a mixture of polyorganosiloxanes of different degrees of polymerization; the polyorganosiloxanes of different degrees of polymerization have different flash points. Therefore, when the silicone oil is gradually heated up, the polyorganosiloxanes of different degrees of polymerization will sequentially evaporate. This way, although some silicone oil is evaporated, the white scattering particles, the first glass powder and the remaining silicone oil still has fluidity, so the white scattering particles and the first glass powder will move closer to each other to fill the volume left by the evaporated silicone oil. As a result, the formation of air cavities is reduced. Therefore, silicone oil is a more preferred organic carrier.

It should be noted that during sintering, the silicone oil including methyl silicone oil is removed by decomposition and evaporation; a small amount of silicon dioxide is generated when the silicone oil decomposes. This amount of silicon dioxide has virtually no impact on the scattering effect of the diffuse reflection layer.

Of course, in situations that are not sensitive to the amount of air cavities of the diffuse reflection layer, the step of low temperature heating to remove the silicone oil can be omitted, and sintering can be carried out directly.

In fact, only when the heating temperature T1 is lower than the sintering temperature T2 in step S15, it is helpful to pre-remove the silicone oil by low temperature heating, as it slows down the evaporation of the silicone oil. Therefore, T2 should be set to be higher than T1. However, when the temperatures T2 and T1 are close to each other, the evaporation speeds of the silicone oil during the two heating steps are not significantly different, so the effect of low temperature heating for removing the silicone oil is not significant. Therefore, here the temperatures T1 and T2 preferably meet the following condition: T2−T1≥100° C.

S36. Obtaining appropriate amounts of methyl silicone oil, phosphor powder, and second glass powder.

The sequence of step S36 and the previous steps is not fixed and can be any sequence. In step S36, the function of the methyl silicone oil is similar to that in step S32, the only difference being the other components are the phosphor powder and the second glass powder.

S37. Uniformly mixing the methyl silicone oil, the phosphor powder, and the second glass powder to form a slurry of phosphor powder.

Step S37 is similar to step S33, and the function of the methyl silicone oil is to act as the carrier for the phosphor powder and the second glass powder.

S38. Coating the phosphor powder slurry on the diffuse reflection layer which is on the high thermal conductivity substrate.

In step S38, the diffuse reflection layer is the carrier of the phosphor powder slurry. The coating method is similar to that in step S34.

S39. Sinter the high thermal conductivity ceramic substrate with the phosphor powder slurry coating to form the phosphor layer.

The sintering process in this step is similar to that in step S35, one difference being the sintering temperature satisfies: T3≤Tf+400° C., where Tf is the softening point of the first glass powder. Also, a low temperature heating step may be similarly preformed to pre-remove the silicone oil.

It should be noted that in this embodiment, when sintering the diffuse reflection layer and the phosphor layer, an organic carrier, silicone oil, is used as a carrier to make the mixing of the different substances more uniform. But it should be understood that the diffuse reflection layer and the phosphor layer are independent of each other, and the formation of each of them can use separate organic carrier to assist in the formation.

Another embodiment of the present invention provides a light emitting device, including a wavelength conversion device as described in the above embodiments, and further including an excitation light source for generating an excitation light. The phosphor absorbs the excitation light to generate a converted light. The diffuse reflection layer scatter-reflects the converted light or a mixed light of the converted light and unabsorbed excitation light. The high thermal conductivity substrate dissipates the heat conducted through the diffuse reflection layer into the air.

The above descriptions disclose the embodiments of the present invention, but do not limit the scope of the invention. Thus, it is intended that the present invention cover modifications and variations that come within the scope of the appended claims and their equivalents, as well as direct or indirect applications of the embodiments in other related technical fields.

What is claimed is:
1. A wavelength conversion device, comprising:
a phosphor layer, which includes a phosphor powder;
a diffuse reflection layer, which includes white scattering particles for scattering an incident light; and
a high thermal conductivity substrate, which is selected from: an aluminum nitride substrate, a silicon nitride substrate, a silicon carbide substrate, a boron nitride substrate, and a beryllium oxide substrate;

wherein the phosphor layer, the diffuse reflection layer and the high thermal conductivity substrate are stacked sequentially and affixed to each other, wherein the phosphor layer is in direct contact with the diffuse reflection layer, and the diffuse reflection layer is in direct contact with the high thermal conductivity substrate;

wherein the diffuse reflection layer further includes a first glass material for adhering the white scattering particles, and wherein the phosphor layer further includes a second glass material for adhering the phosphor powder, wherein the first glass material and the second glass material are the same high melting point glass material.

2. The wavelength conversion device of claim 1, wherein a thermal conductivity of the high thermal conductivity substrate is greater than or equal to 100 W/mK.

3. The wavelength conversion device of claim 1, wherein the white scattering particles include at least one of: barium sulfate particles, aluminum oxide particles, magnesium oxide particles, titanium oxide particles, and zirconium oxide particles.

4. A light source device, comprising:

the wavelength conversion device of claim 1; and an excitation light source for generating an excitation light, wherein the phosphor powder absorbs the excitation light to generate a converted light, and wherein the diffuse reflection layer scatter-reflects the converted light or a mixed light of the converted light and unabsorbed excitation light.

* * * * *